United States Patent
Schaap (10) Patent No.: US 12,368,584 B2
(45) Date of Patent: Jul. 22, 2025

(54) TIME-BASED ENCRYPTION KEY DERIVATION

(71) Applicant: Apple Inc., Cupertino, CA (US)

(72) Inventor: Tristan F. Schaap, San Francisco, CA (US)

(*) Notice: Subject to any disclaimer, the term of this patent is extended or adjusted under 35 U.S.C. 154(b) by 0 days.

(21) Appl. No.: 18/145,454

(22) Filed: Dec. 22, 2022

(65) Prior Publication Data

US 2023/0125937 A1    Apr. 27, 2023

Related U.S. Application Data

(62) Division of application No. 16/614,346, filed as application No. PCT/US2018/030275 on Apr. 30, 2018, now Pat. No. 11,539,518.

(Continued)

(51) Int. Cl.
*H04L 9/08* (2006.01)
*G06F 1/12* (2006.01)
*H04L 9/14* (2006.01)

(52) U.S. Cl.
CPC ............... *H04L 9/0872* (2013.01); *G06F 1/12* (2013.01); *H04L 9/0819* (2013.01); *H04L 9/0869* (2013.01); *H04L 9/14* (2013.01)

(58) Field of Classification Search
CPC ..... G06F 1/12; H04L 2209/84; H04L 9/0819; H04L 9/0869; H04L 9/0872; H04L 9/14
See application file for complete search history.

(56) References Cited

U.S. PATENT DOCUMENTS 6,367,014 B1 * 4/2002 Proust ................... H04L 9/3242
380/247
6,393,126 B1 * 5/2002 van der Kaay ....... H04L 63/123
713/172

(Continued)

FOREIGN PATENT DOCUMENTS

WO     WO 00/79348    * 12/2000

OTHER PUBLICATIONS

Selcuk Uluagac et al., Secure Source-Based Loose Synchronization (SOBAS) for Wireless Sensor Networks, in Transactions on Parallel and Distributed Systems (Apr. 2013) (Year: 2013).*

(Continued)

*Primary Examiner* — Sharon S Lynch
(74) *Attorney, Agent, or Firm* — Kowert, Hood, Munyon, Rankin & Goetzel, P.C.; Paul T. Seegers; Dean M. Munyon (57) ABSTRACT

Techniques are disclosed securely communicating traffic over a network. In some embodiments, an apparatus includes a first circuit having a local clock configured to maintain a local time value. The first circuit is configured to determine a synchronized time value based on the local time value, the synchronized time value being an expected time value of a reference clock. The first circuit is further configured to generate a first encryption key by calculating a key derivation function based on the synchronized time value and encrypt a portion of a packet using the first encryption key, the portion of the packet being to be communicated to a second circuit. In some embodiments, the apparatus further includes a first network node coupled to the first circuit and configured to communicate the packet to a second network node coupled to the second circuit and to include the synchronized time value in the packet.

20 Claims, 7 Drawing Sheets

Related U.S. Application Data (60) Provisional application No. 62/507,468, filed on May 17, 2017.

(56) References Cited

U.S. PATENT DOCUMENTS

| | | | | |
|---|---|---|---|---|
| 6,446,092 | B1* | 9/2002 | Sutter | G06F 16/273 |
| | | | | 707/999.203 |
| 6,665,316 | B1* | 12/2003 | Eidson | H04J 3/0641 |
| | | | | 375/356 |
| 6,904,110 | B2* | 6/2005 | Trans | H04L 25/14 |
| | | | | 375/350 |
| 7,000,031 | B2* | 2/2006 | Fischer | H04L 1/18 |
| | | | | 709/248 |
| 7,103,072 | B1* | 9/2006 | Sloan | H04J 3/0685 |
| | | | | 370/503 |
| 7,392,382 | B1* | 6/2008 | Weis | H04L 9/088 |
| | | | | 173/160 |
| 7,468,981 | B2* | 12/2008 | Weis | H04J 3/0661 |
| | | | | 370/395.52 |
| 7,676,679 | B2* | 3/2010 | Weis | H04L 9/12 |
| | | | | 713/502 |
| 7,949,133 | B2* | 5/2011 | Pinder | H04N 21/2221 |
| | | | | 380/35 |
| 8,359,643 | B2* | 1/2013 | Low | H04L 9/40 |
| | | | | 370/254 |
| 8,386,765 | B2* | 2/2013 | Fries | H04L 63/123 |
| | | | | 713/160 |
| 8,428,069 | B2* | 4/2013 | Howe | H04L 47/2416 |
| | | | | 370/395.51 |
| 8,515,069 | B2* | 8/2013 | Kuo | H04J 3/0667 |
| | | | | 713/168 |
| 8,588,416 | B2* | 11/2013 | Eigle | H04L 9/0662 |
| | | | | 380/258 |
| 8,695,078 | B2* | 4/2014 | Low | H04W 8/186 |
| | | | | 370/254 |
| 8,705,348 | B2* | 4/2014 | Fluhrer | H04L 69/28 |
| | | | | 380/255 |
| 9,065,640 | B2* | 6/2015 | Yoon | H04W 12/50 |
| 9,264,404 | B1* | 2/2016 | Lambert | H04L 9/3239 |
| 9,306,977 | B2* | 4/2016 | Howe | H04L 49/602 |
| 9,425,968 | B2* | 8/2016 | Demeter | H04L 63/06 |
| 9,724,972 | B2* | 8/2017 | Zucchetti | B60C 23/0462 |
| 10,095,859 | B2* | 10/2018 | Miyake | H04L 9/3228 |
| 10,250,613 | B2* | 4/2019 | Liu | H04L 63/0428 |
| 10,608,698 | B2* | 3/2020 | Juntunen | H04B 1/7156 |
| 10,952,043 | B2* | 3/2021 | Nguyen | H04W 4/40 |
| 11,153,287 | B2* | 10/2021 | Moon | H04L 63/061 |
| 2002/0056042 | A1* | 5/2002 | van der Kaay | H04L 63/12 |
| | | | | 713/178 |
| 2002/0163932 | A1* | 11/2002 | Fischer | H04L 1/1883 |
| | | | | 370/465 |
| 2003/0016770 | A1* | 1/2003 | Trans | H04B 3/32 |
| | | | | 375/346 |
| 2003/0086515 | A1* | 5/2003 | Trans | H04L 1/0054 |
| | | | | 375/346 |
| 2005/0094640 | A1* | 5/2005 | Howe | H04L 47/2416 |
| | | | | 370/474 |
| 2005/0186933 | A1* | 8/2005 | Trans | H04L 7/0008 |
| | | | | 375/348 |
| 2006/0184797 | A1* | 8/2006 | Weis | H04L 9/3297 |
| | | | | 713/178 |
| 2006/0239218 | A1* | 10/2006 | Weis | H04J 3/0661 |
| | | | | 370/312 |
| 2008/0260151 | A1* | 10/2008 | Fluhrer | H04L 63/04 |
| | | | | 380/255 |
| 2009/0080648 | A1* | 3/2009 | Pinder | H04L 63/0428 |
| | | | | 380/37 |
| 2010/0070758 | A1* | 3/2010 | Low | H04L 9/40 |
| | | | | 709/204 |
| 2010/0098249 | A1* | 4/2010 | Shin | H04L 9/0872 |
| | | | | 380/44 |
| 2010/0104100 | A1* | 4/2010 | William Gibbens | H04L 9/12 |
| | | | | 380/277 |
| 2010/0153725 | A1* | 6/2010 | Koo | H04L 9/0891 |
| | | | | 380/278 |
| 2010/0153742 | A1* | 6/2010 | Kuo | H04J 3/0667 |
| | | | | 713/189 |
| 2010/0260167 | A1* | 10/2010 | Kim | H04J 3/0673 |
| | | | | 370/350 |
| 2013/0104221 | A1* | 4/2013 | Low | H04L 63/08 |
| | | | | 709/204 |
| 2013/0266139 | A1* | 10/2013 | Abl | H04L 9/0847 |
| | | | | 380/255 |
| 2014/0068247 | A1* | 3/2014 | Davis | H04L 9/3228 |
| | | | | 713/182 |
| 2014/0090011 | A1* | 3/2014 | Howe | H04L 47/2416 |
| | | | | 726/1 |
| 2015/0103818 | A1* | 4/2015 | Kuhn | H04W 56/00 |
| | | | | 370/350 |
| 2015/0143108 | A1* | 5/2015 | Demeter | H04L 63/0823 |
| | | | | 713/158 |
| 2015/0207795 | A1* | 7/2015 | Wentz | G06F 21/44 |
| | | | | 726/4 |
| 2016/0269168 | A1* | 9/2016 | Carstens | G07F 17/13 |
| 2016/0371481 | A1* | 12/2016 | Miyake | H04L 9/3228 |
| 2017/0141865 | A1* | 5/2017 | Ha | H04J 3/0667 |
| 2017/0310359 | A1* | 10/2017 | Juntunen | H04B 1/713 |
| 2018/0198766 | A1* | 7/2018 | Moon | H04L 9/14 |
| 2018/0234393 | A1* | 8/2018 | Gram | H04L 9/0872 |
| 2020/0084738 | A1* | 3/2020 | Nguyen | H04W 64/003 |
| 2021/0113653 | A1* | 4/2021 | Pakyari | C07K 14/7051 |

OTHER PUBLICATIONS

Rivest Cipher 4 (RC4), Wikipedia (Wayback Machine Dated Apr. 25, 2017) (Year: 2017).*

* cited by examiner

TIME-BASED ENCRYPTION KEY DERIVATION

The present application is a divisional of U.S. application Ser. No. 16/614,346, entitled "TIME-BASED ENCRYPTION KEY DERIVATION," filed Nov. 15, 2019 (now U.S. Pat. No. 11,539,518), which is a National Stage Entry of PCT/US2018/030275, entitled "TIME-BASED ENCRYPTION KEY DERIVATION," filed Apr. 30, 2018, which claims priority to U.S. provisional Appl No. 62/507,468, entitled "TIME-BASED ENCRYPTION KEY DERIVATION," filed May 17, 2017; the disclosures of each of the above-referenced applications are incorporated by reference herein in their entireties.

BACKGROUND

Technical Field

This disclosure relates generally to computer networks, and, more specifically, to securely communicating traffic over a network.

Description of the Related Art

Encryption is frequently used in network communications, such as those over the Internet, to prevent content of intercepted traffic from being viewed. When symmetric encryption is used, two communicating parties establish a shared secret (e.g., a shared key) to facilitate encryption and decryption. In some instances, a shared secret may be established using an out-of-band connection between parties—e.g., one person may hand another a USB key including an encryption key. In other instances, a key exchange algorithm may be performed to establish a shared secrete—e.g., the Diffie-Hellman key exchange perhaps being the most commonly used algorithm. In still other instances, a shared key may be established using asymmetric encryption. Under such a scheme, a first party may derive a key and encrypt it using a public key of a second party, which then decrypts the encrypted key using a corresponding private key.

SUMMARY

The present disclosure describes embodiments in which network traffic is communicated securely using a cryptographic key derived based on a time value. In some embodiments, an apparatus includes a first circuit having a local clock configured to maintain a local time value. The first circuit determines a synchronized time value based on the local time value, the synchronized time value being an expected time value of a reference clock. The first circuit generates a first encryption key by calculating a key derivation function based on the synchronized time value and encrypts a portion of a packet using the first encryption key. The portion is then communicated to a second circuit. In some embodiments, the apparatus further includes a first network node coupled to the first circuit. The first network node communicates the packet to a second network node coupled to the second circuit and includes the synchronized time value in the packet as a packet identifier usable by the second circuit to validate the packet.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units." "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "node configured to communicate traffic over a network" is intended to cover, for example, a device that has circuitry that performs this function during operation, even if the device in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first." "second," etc. are used as labels for nouns that they precede, and do not imply any type of ordering (e.g., spatial, temporal, logical, etc.) unless specifically stated. For example, an exchange between a first circuit and a second circuit may include the communication of multiple messages. The terms "first" and "second" can be used to refer to any two of messages in the exchange. In other words, the "first" and "second" messages are not limited to the initial two messages in the exchange, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "synchronize" refers to calculating, for a first clock, an adjustment to be made to the first clock to determine the value of a second clock. While this term encompasses adjusting the value in the first clock to have the same time as the second clock, this term, for the sake of this disclosure, also encompasses not adjusting the value in the first clock. For example, "synchronizing" a first clock with a second clock may include calculating an adjustment for the first clock and applying the adjustment to a time value output by the first clock in order to determine a time value of the second clock. This determined time value may be referred to herein as a "synchronized time value."

DETAILED DESCRIPTION

When communicating traffic between two parties, it is important to periodically generate new encryption keys as a precaution against a given one of the encryption keys becoming compromised. In many instances, a pseudorandom number generator may be used to supply entropy for generating new encryption keys. A downside of using this approach, however, is that a pseudorandom number generator can potentially produce the same entropy once in a while, which may result in a previously generated encryption key being regenerated and used again. If this previous key was ever compromised, any subsequent traffic encrypted using the regenerated key is susceptible to decryption with the compromised key.

The present disclosure describes various techniques for reducing the possibility of regenerating a previously used encryption key. As will be described below, in various embodiments, a network node communicating encrypted traffic may include (or be associated with) a clock configured to maintain a time value used to derive encryption keys. (As used herein, the terms "encrypt" and "encryption" refer broadly to the performance of a cryptographic operation, which can include encryption as well as decryption, keyed-hash generation and verification, digital signature generation and verification, etc.) In some embodiments, this clock is substantially monotonic. (As used herein, the term "sustainably monotonic" refers to a clock that does not roll over for the lifetime of the device including the clock—i.e., the value maintained by the clock increases (or decreases) for the lifetime of the device without repeating.) As a result, keys may be derived using a non-reoccurring seed, and thus, are not inadvertently regenerated. In various embodiments, time is also synchronized across network nodes communicating encrypted traffic. In doing so, one network node may be prevented from inadvertently deriving and using a key that was previously used by another node in the network. That is, if the clock of a first node were lagging behind a second node's clock, for example, the first node might use the same time value previously used by the second node to generate a key. This potential issue, however, is mitigated when time is synchronized between the two nodes. Still further, in some embodiments, synchronized time may also be used to coordinate when nodes roll over keys (i.e., generate a new key and discontinue use of an old key) and to validate encrypted traffic.

In some embodiments, encryption keys are generated by secure circuits coupled to network nodes communicating the encrypted traffic (as opposed to the nodes themselves handling key generation). As used herein, the term "secure circuit" refers to a circuit that protects an isolated, internal resource from being directly accessed by an external entity. As will be described below, in various embodiments, a secure circuit may maintain a local clock for a network node and keys used to encrypt and decrypt network traffic. The secure circuit may also perform some (or all) of the encryption and decryption for a node. In some instances, using secure circuits to process messages (as opposed to the nodes) may provide additional security to the network.

Figure 1:
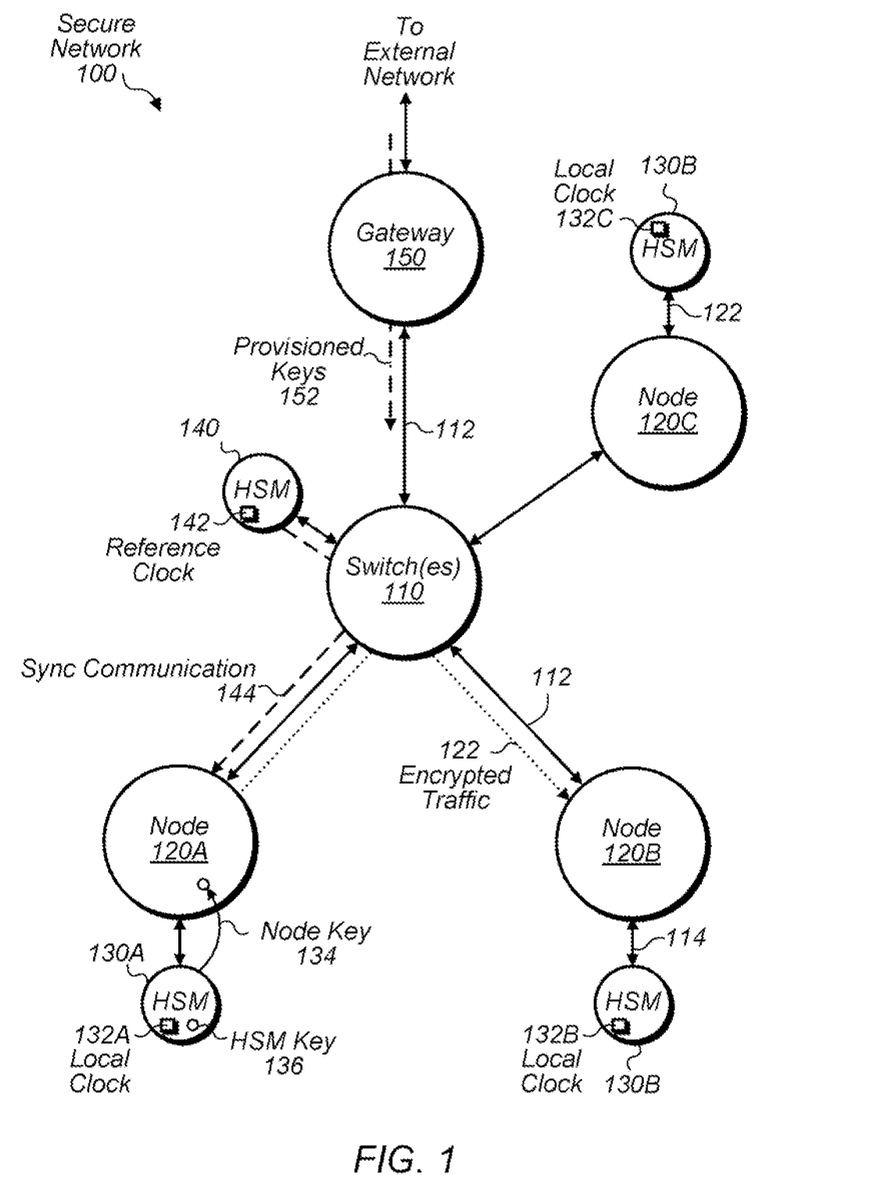
FIG. 1 is a block diagram illustrating an example of a network that implements secure communications using time-based key derivation.

Turning now to FIG. 1, a block diagram of a secure network 100 that uses time-based encryption keys is depicted. In the illustrated embodiment, network 100 includes a switch 110 coupled to multiple nodes 120A-C via links 112. Nodes 120A-C, in turn, are coupled via links 114 to respective hardware security modules (HSMs) 130A-C, which include local clocks 132A-C. As shown, switch 110 is coupled to HSM 140, which includes a reference clock 142. Switch 110 is also coupled to a gateway 150, which may be coupled to an external network. In various embodiments, network 100 may be implemented differently than shown. Accordingly, in some embodiments, more (or less) switches 110 and/or nodes 120 may be present. In some embodiments, HSM 140 may be coupled to a node 120 (as opposed to a switch 110). In some embodiments, functionality described herein with respect to HSMs 130 may be implemented by circuitry in nodes 120.

Network 100, in some embodiments, is a local area network (LAN) configured to communicate network traffic 122 among nodes 120. In various embodiments, network traffic is routed among nodes 120 by switches 110. Accordingly, switches 110 may be configured to queue received messages (i.e., data frames/packets) from nodes 120 and analyze the source and destination addresses specified by the frames in order to appropriately send the messages on to their specified destinations. In some embodiments, switches 110 are configured to route data frames in accordance with IEEE 802.3 (i.e., Ethernet Frames); however, in other embodiments, other networking protocols may be supported. In the illustrated embodiment, network 100 is coupled to an external network (e.g., the Internet) via a gateway device 150. In some embodiments, gateway 150 is configured to implement a firewall and perform network address translation (NAT) for network 100.

Nodes 120 may correspond to any suitable devices configured to communicate traffic 122, which may be encrypted in order to provide data integrity, data origin authentication, and/or confidentiality. In some embodiments, nodes 120 may be devices within a home or office network such as desktop and laptop computers, mobile devices, smart television, smart appliances, etc. In some embodiments, nodes 120 are machines within a fabrication plant that are configured to perform various operations. In some embodiments, nodes 120 are electronic control units (ECUs) in a vehicle such as an aircraft, boat, automobile, recreational vehicle, etc. As used herein, the term "electronic control unit (ECU)" is to be interpreted according to its understood meaning in the art, and includes an embedded system (e.g., microcontroller) that controls one or more systems of a vehicle. As used herein, the term "vehicle network" refers to an internal communications network that interconnects components (e.g., ECUs) inside a vehicle. In some embodiments, nodes 120 may include, for example, a motor ECU that communicates torque-control messages and wheel-speed messages in order to control operation of a motor, a brake-system ECU that communicates brake control messages in order to apply braking, a LIDAR ECU that processes data received from one or more LIDAR sensors, a flight yoke ECU that communicates angles of the yoke controls, etc.

Hardware security modules (HSMs) 130, in one embodiment, are secure circuits configured to generate encryption keys used to encrypt traffic 122 being communicated between nodes 120. In some embodiments, HSMs 130 generate node keys 134 for their respective nodes 120, which are configured to use the keys 134 perform encryption and decryption of network traffic 122. In some embodiments, HSMs 130 are configured to generate HSM keys 136 and use the keys 136 to encrypt and decrypt network traffic 122 for nodes 120. In the illustrated embodiment, however, HSMs 130 are configured to generate both node keys 134 used by nodes 120 to encrypt a portion of a packet and HSM keys 136 used by HSMs 130 to encrypt another portion of the packet. (As used herein, the term "portion" may refer to less than an entirety or an entirety of something.) In various embodiments, keys 134 and 136 are generated on a per-node basis. For example, if node 120A is supposed to communicate traffic 122 to nodes 120B and node 120C. HSM 130A may generate a first set of keys 134 and 136 for communicating with node 120B and a second set of keys 134 and 136 for communicating with node 120C. In some embodiments, keys 134 and 136 may be applicable to only one direction of traffic flow. For example, node 120A may generate a first set of keys 134 and 136 for encrypting traffic 122 to node 120B and a second set of keys 134 and 136 for decrypting traffic 122 received from node 120B. In various embodiments, keys 134 and 136 are generated anew for each new network session. For example, if nodes 120A and 120B establish a network session every 100 ms for communicating traffic 122. HSMs 130A and 130B may generate new keys 134 and 136 every 100 ms. Still further, in some embodiments, HSMs 130 are configured to roll over keys 134 and 136 periodically, which may occur during a given network session. For example, HSMs 130 may roll over keys 134 and 136 every four seconds. If a network session is ongoing. HSMs 130 and nodes 120 may transition from using one set of keys 134 and 136 to another, new set of keys 134 and 136.

As will be described below, in various embodiments, HSMs 130 are configured to generate keys 134 and 136 based on time values maintained by local clocks 132, which are synchronized with a reference clock 142. In some embodiments, HSMs 130 may also use local clocks 132 for other purposes such as provide timing information to nodes 120, which may use the timing information to coordinate various operation such as coordinating communication of traffic 122 over network 100.

HSM 140, in one embodiment, is a secure circuit configured to isolate reference clock 142, which is configured to maintain a reference time for network 100—i.e., the time to which local clocks 132 are synchronized. In the illustrated embodiment, local clocks 132 synchronize with reference clock 142 via sync communications 144. In various embodiments, sync communications 144 include sync messages that periodically sent by HSM 140 to announce the current value of reference clock 142. HSMs 130 may use this information to determine offsets between their respective clocks 132 and clock 142. Such an offset may account for a difference between the value of a local clock 132 and the announced value of reference clock 142 as well as any difference in frequency that may exists bet-ween a clock 132 and a clock 142. Sync messages may be sent on a periodic basis (e.g., eight times a second) as the individual frequencies of clocks 132 and 142 may fluctuate with temperature changes over time. In various embodiments, sync communications 144 also include performance of a propagation delay exchange in order for a given HSM 130 to determine the propagation delay between it and HSM 140, and thus, adjust the announced time in a received sync message to account for this propagation delay. Accordingly, once a given HSM 130 has calculated the offset between its local clock 132 and reference clock 142, the HSM 130 may determine a synchronized time value (i.e., the expected current value of reference clock 142) by applying the offset to the current value of its local clock 132. This value may be described an "expected" value because the actual offset could change after it has been calculated. In some embodiments, sync communication 144 may be performed in accordance with a protocol such as IEEE 802.1AS, the Network Time Protocol (NTP), etc.

In various embodiments, a given HSM 130 is configured to generate keys 134 and 136 by calculating a key derivation function based on a synchronized time value determined from a sync communication 144. As noted above, in some embodiments, reference clock 142 and local clocks 132 are substantially monotonic—e.g., in one embodiment, clocks 132 and 142 are 64-bit clocks that do not rollover for several hundred years. As such, synchronized time may be used as a reliable source for non-reoccurring entropy in order to prevent regenerating previously used keys. Since time is predictable, however, one or more additional factors are used in a calculating the key derivation function such as a salt provided by a random number generator and a provisioned key 152 stored at the HSM 130. (As used herein, the term "salt" refers to a value (e.g., random data) that is combined with other factors to increase entropy for a cryptographic operation such as deriving keys. As used herein, the term "random data" refers to data generated by a pseudo random data generator (e.g., a Yarrow generator, Blum Blum Shub generator, etc.) or data generated by a true random number generator (TRNG) (e.g., hardware that analyzes quantum phenomena.) In some embodiments, calculation of the key derivation function may include using the provisioned key 152 to perform an encryption operation on a current synchronized time value and a salt in order to produce a node key 134 or an HSM key 136 as will be described in greater detail below with respect to FIG. 3.

In various embodiments, gateway 150 is configured to provision HSMs 130 with the keys 152 used to generate keys 134 and 136. In such an embodiment, gateway 150 may receive keys 152 over a wide area network (e.g., the Internet) from a source external to network 1M, and distribute these keys 152 to the appropriate HSMs 130. In some embodiments, keys 134 and 136 are ephemeral keys (i.e., have a short life span); however, provisioned keys 152 may have a longer life span. As with keys 134 and 136, provisioned keys 152 may be specific to particular source and destination nodes 120—e.g., a provisioned key 152 specifically for traffic communicated from node 120A to node 120C. Provisioned keys 152 may also be applicable to a specific direction of traffic. Thus, keys 134 and 136 derived from a given provision key 152 may inherit the properties from that provisioned key—e.g., a provisioned key 152 applicable to traffic being communicated from node 120A to 120C cannot be used to derive keys 134 and 136 for communications between 120A to 120B. Still further, gateway 150 may provision a given HSM 130 with only the keys 152 that it needs to communicate—e.g., node 120A may not be provisioned with a key 152 for communicating with node 120C if node 120A is not intended to communicate with node 120C. In some embodiments in which an HSM 130 is deriving a node key 134 and a corresponding HSM key 136, the HSM 130 may be provisioned with two keys 152—i.e., one for the node key 134 and another for the ISM key 136.

In various embodiments, when keys 134 and 136 are used to encrypt a packet being communicated from one node to another node, an HSM 130 may provide information that is included in the packet in order for a recipient node 120's HSM 130 to determine which keys 134 and 136 are to be used for decryption. As will be described in greater detail below with respect to FIG. 4, in some embodiments, this provided information may include a key identifier, which may correspond to a salt used to derive the keys 134 and 136. This information may also include the synchronized time value used to derive the keys 134 and 136. Accordingly, when a recipient node 120 receives an encrypted packet, the node 120 may provide this information to its HSM 130, which, in some embodiments, uses this information along with a provisioned key 152 to derive the keys 134 and 136 used to decrypt the packet. In some embodiments discussed with FIG. 4, the synchronized time value may be included as a packet identifier, which is additionally used to validate the packet.

In various embodiments, HSMs 130 are configured to periodically roll over keys 134 and 136 in order to account for a key 134 or 136 becoming compromised. In some embodiments, HSMs 130 coordinate key rollover based on the synchronized time among local clocks 132. In doing so, HSMs 130 may provide rollback protection such that a given node 120 or HSM 130 is not attempting to use keys 134 or 136 after they have expired. Still further, in some embodiments, HSMs 130 may be configured to generate a set of new keys 134 and 136 in anticipation of a rollover (i.e., prior discontinuing use of the older set of keys 134 and 136), so that transition to using the new set can occur more seamlessly. As will be described below with FIG. 4, a network session may rely on the same salt for the entire session. Thus, if any rollover occurs during the session, the new keys can be derived using the previously established salt and the value of synchronized time when the rollover is to occur.

Figure 2:
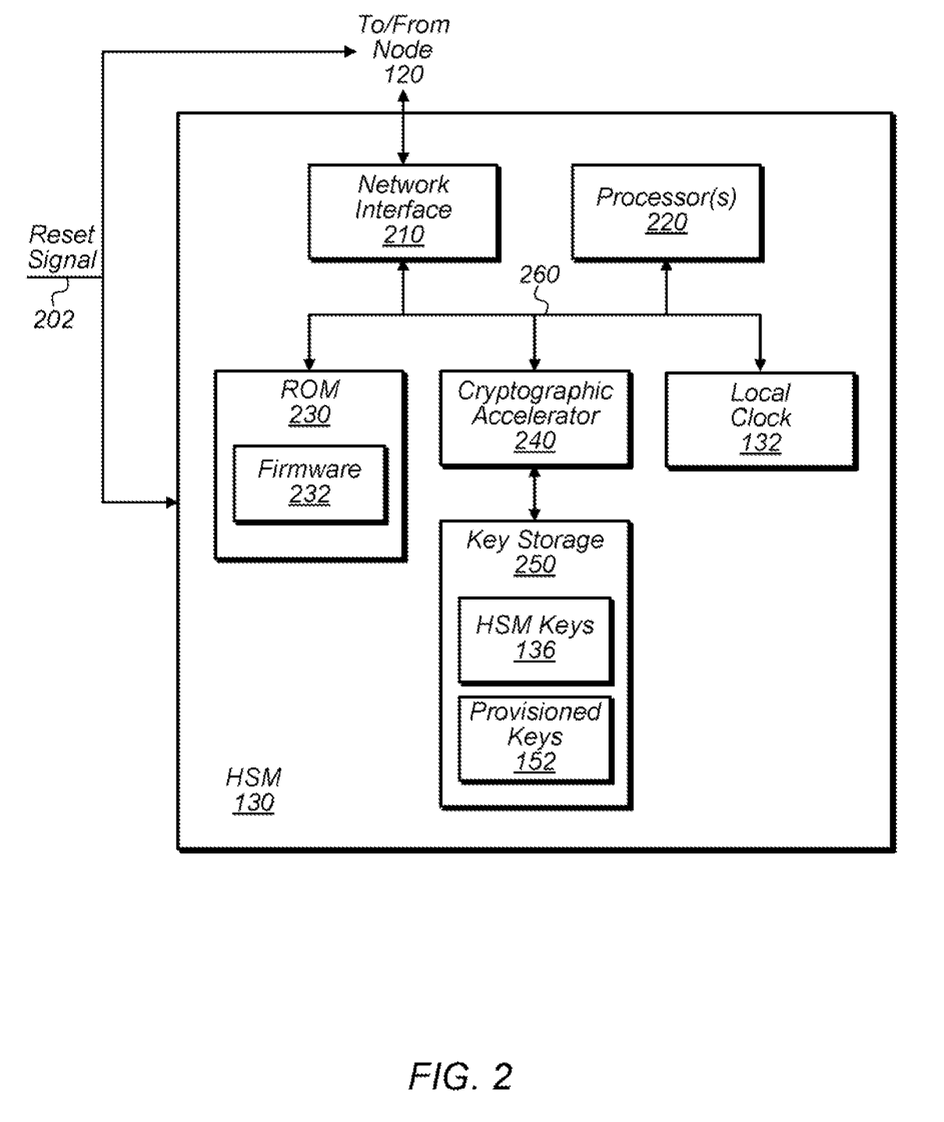
FIG. 2 is a block diagram illustrating an example of a hardware security module configured to perform time synchronization and key derivation.

Turning now to FIG. 2, a block diagram of an HSM 130 is depicted. As noted above, in some embodiments. HSMs 130 may be used for key generation and maintaining local time because HSMs 130 may be more secure for the reasons discussed below. In the illustrated embodiment, HSM 130 includes a network interface 210, one or more processors 220, a read only memory (ROM) 230, a cryptographic accelerator 240, a key storage 250, and local clock 132 coupled together via an interconnect 260. ROM 230 also includes firmware 232. Key storage 250 also includes one or more HSM keys 136 and provisioned keys 152. In some embodiments. HSM 130 may include more (or less) components than shown. (in some embodiments. HSM 140 may implement functionality described herein with respect to HSM 130.)

Network interface 210, in one embodiment, is configured to facilitate communication with a node 120. Accordingly, interface 210 may encode and decode data across a link 114, which, in some embodiments, is a serial peripheral interface (SPI) bus. In various embodiments, interface 210 is also configured to isolate internal components 132 and 220-250 from an external entity such as node 120, by filtering incoming read and write operations. In some embodiments. HSM 130 presents a limited attack surface by supporting only a small number of commands. For example, in one embodiment, HSM 130 supports a command allowing node 120 to request creation of keys 134 and 136, request encryption and decryption using an HSM key 136, and request the current time. If interface 210 receives data from a node 120 that is not a supported command, interface 210 may prevent the data from entering HSM 130. In doing so. HSM 130 prevents, for example, node 120 from being able to access local clock 132 directly.

Processor 220, in one embodiment, is configured to execute program instructions to implement various operations described herein with respect to HSM 130. In some embodiments, processor 220 is hardwired to fetch from a specific address range at boot in order to boot firmware 232 from ROM 230. Notably, because memory 230 is a ROM (as opposed to some other type of memory that can easily be written to), firmware 232 is resistant to modification, and thus, being tampered with. As a result. HSM 130 can be restored to a default, trusted state by merely causing processor 220 to reboot, which, in the illustrated embodiment, can be initiated by asserting reset signal 202. Thus, processor 220 may further serve to isolate components in HSM 130.

Cryptographic accelerator 240, in one embodiment, is circuitry configured to perform cryptographic operations for HSM 130 including key derivation. Cryptographic accelerator 240 may implement any suitable encryption algorithm such as Data Encryption Standard (DES), Advanced Encryption Standard (AES), Rivest Shamir Adleman (RSA). HMAC, etc. In the illustrated embodiment, accelerator 240 is configured to use keys stored in key storage 250, which accelerator 240 may isolate from being accessed by other components of HSM 130. That is, in some embodiments, accelerator 240 may allow a provisioned key 152 to be updated by processor 220, but not allow the key 152 to be read from storage 250 by processor 220.

Figure 3:
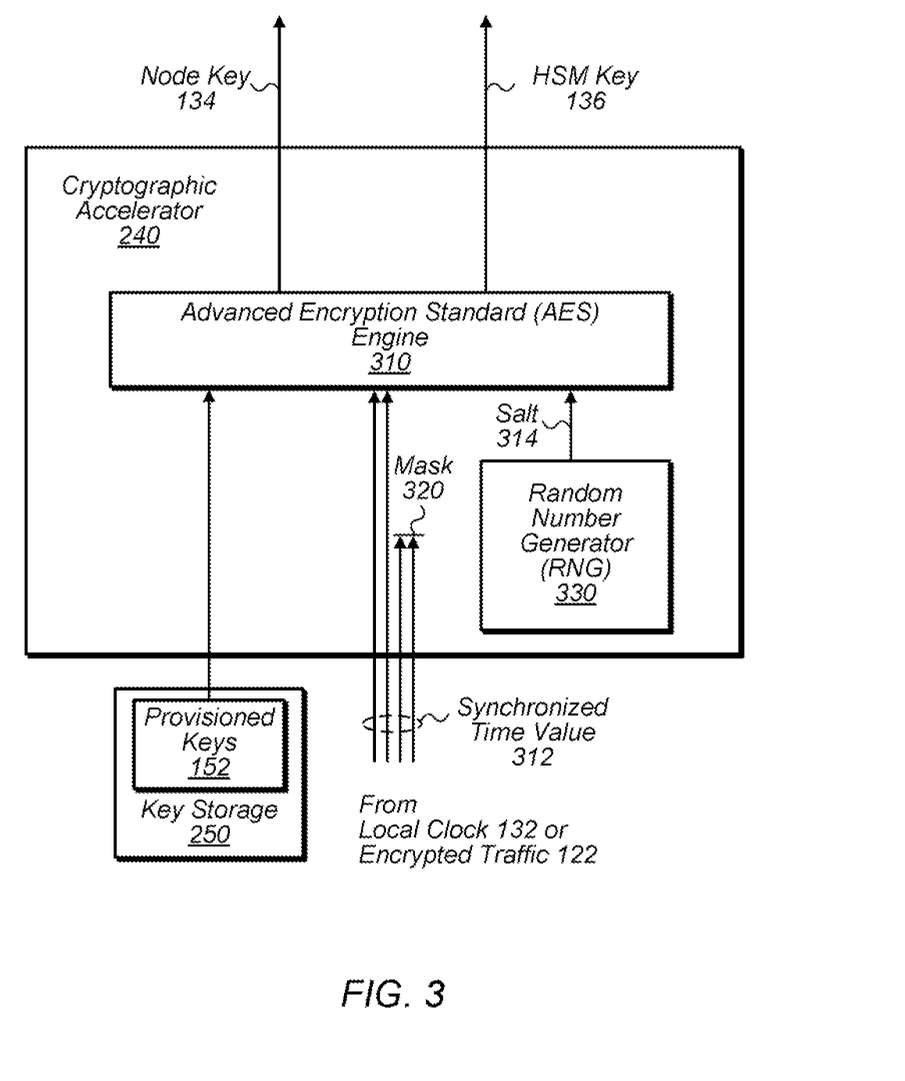
FIG. 3 is a block diagram illustrating an example of a cryptographic accelerator, which may be included in the hardware security module.

Turning now to FIG. 3, a block diagram of cryptographic accelerator 240 is depicted. As noted above, in some embodiments, keys 134 and 136 may be determined using a key derivation function that is calculated by performing encryption. Accordingly, in the illustrated embodiment, accelerator 240 includes an advanced encryption standard (AES) engine 310, mask 320, and random number generator (RNG) 330 for determining keys 134 and 136. In some embodiments, accelerator 240 may include more (or less) components than shown.

AES engine 310, in one embodiment, is circuitry configured to perform AES encryption and decryption operations. In the illustrated embodiment, AES engine 310 is configured to derive a node key 134 or an HSM key 136 by using a provisioned key 152 to encrypt a portion of a synchronized time value 312 and a salt 314, which may be concatenated together prior to encryption. In some embodiments, engine 310 may specifically perform 128-bit encryption using AES in Galois/Counter Mode (AES-GCM) and/or electronic codebook (ECB) mode. In other embodiments, cryptographic algorithms other than AES may be used such as those noted above; still further other forms of key derivation functions may be employed. In some embodiments, additional factors may be included such as additional padding to increase the number characters encrypted by engine 310.

As shown in FIG. 3, engine 310 may receive synchronized time value 312 from a local clock 132 or from encrypted traffic 122. Reception from local clock 132 may occur when the node 120 coupled to the HSM 130 is the sender of encrypted traffic 122. In such an event, synchronized time value 312 may be determined as discussed above based on the current value of local clock 132 adjusted to account for an offset determined based on sync communications 144. Reception from encrypted traffic 122 may occur when the node 120 coupled to the HSM 130 is the recipient of traffic 122. In such an event, node 120 may extract a synchronized time value 312 from the encrypted traffic 122 (e.g., from a packet identifier field in a packet as discussed below) and provide this value to HSM 130 for deriving keys 134 and 136 used to decrypt the received encrypted traffic 122.

Mask 320, in one embodiment, is circuitry configured to provide only a subset of the bits specifying the current synchronized time value 312. Accordingly, in some embodiments, mask 320 is circuitry configured to read a portion of the register storing synchronized time value 312. For example, the register may support reading half of its contents corresponding to the higher-order bits. In other embodiments, mask 320 may include OR gates configured to replace a portion of bits with a default value (e.g., all ones) and leave the portion provide to engine 310 intact. In some embodiments, mask 320 may be implemented by program instructions executable by processor 220.

In some embodiments, HSM 130 may determine when to roll over keys 134 and 136 based on whether any bits in the provided portion of time value 312 have changed. For example, synchronized time value 312 may be represented using 64 bits, where mask 320 removes the lower-order 32 bits of value 312 and provides the higher-order 32 bits of value 312 to engine 310. In this example, synchronized time value 312 may be incremented every nanosecond; however, the higher-order 32 bits may only change once every four second. Accordingly, HSM 130 may determine to roll over keys 134 and 136 every four seconds in response to any of the higher-order 32 bits changing.

RNG 330, in one embodiments, is circuitry configured to generate a salt 314 by using a random number generator (RNG) algorithm. RNG 330 may use any suitable algorithm such as Yarrow, a linear congruential generator (LCG), etc. In some embodiments, these algorithms may also use a synchronized time value 312 as an input. As will discussed with FIG. 4, a salt 314 may be included in a packet as a key identifier usable by a recipient to derive a decryption key.

Figure 4:
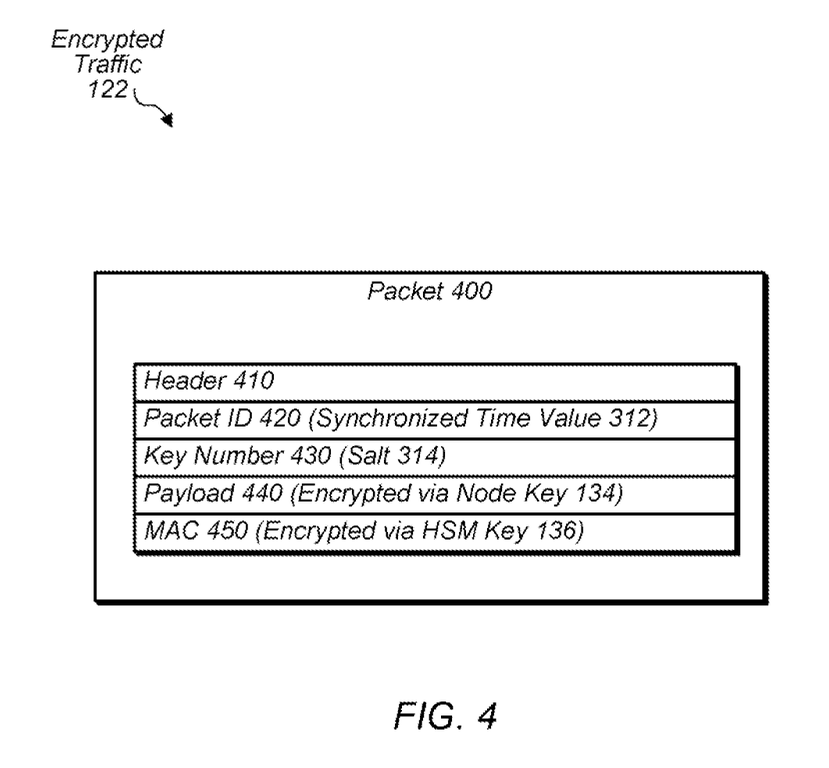
FIG. 4 is a block diagram illustrating an example of a data frame communicated over the network.

Turning now to FIG. 4, a block diagram of a packet 400 included in encrypted traffic 122 is depicted. As noted above, in various embodiments, encrypted traffic 122 may include packets having portions encrypted by node 120 and by HSM 130 as well as information usable by a recipient to determine appropriate decryption keys 134 and 136. In the illustrated embodiment, encrypted traffic 122 includes a packet 400 having fields for a header 410, packet identifier 420, key number 430, payload 440, and a message authentication code (MAC) 450. In some embodiments, more (or less) fields may be included in packet 400. For example, in one embodiment, each of the depicted fields may be included if packet 400 is an initial packet in a given network session; however, subsequent packets 400 may omit, for example, key number 430.

Header 410 includes information usable to route packet 400 through network 100 such as a sender's network address and a recipient's network address. In various embodiments, this information may be used to determine which keys 134 and 136 to use for encryption and decryption for a given packet 400. This information may also be used to determine which provisioned keys 152 to be use for deriving keys 134 and 136. In some embodiments, header 410 may include one or more of fields 420, 430, or 450.

Packet identifier 420 is a value that is uniquely assigned to a given packet and may be used to determine an ordering in which packets are transmitted within a given session of network traffic 122. As shown, in various embodiments, a synchronized time value 312 may be used as the packet identifier 420—i.e., the current value of synchronized time at transmission may be inserted into packet 400 as packet identifier 420. In doing so, a packet identifier 420 may be used by the HSM 130 coupled to a receiving node 120 to derive the keys 134 and 136 for decrypting payload 440 and MAC 450 discussed below. Still further, in some embodiments, packet identifiers 420 may be used by an HSM 130 to validate received encrypted traffic 122. First, in such an embodiment, an HSM 130 may perform a timeliness check in which the HSM 130 compares the packet identifier 420 of a given packet with the current value of synchronized time in order to ensure that the difference does not exceed a threshold amount (e.g., because the packet identifier 420 is old, pertains to a time too far into the future, or is received out of sequence). If the difference does exceed this threshold, the HSM 130 may consider the packet 400 to be invalid. Second, an HSM 130 may compare a packet identifier 420 of a given packet with identifiers 420 of other packets 400 in a given network session. If the identifier 420 of the given packet 400 indicates that the packet 400 is received out of order (or, at least, has a value that significantly differs from the other packets in that session), the HSM 130 may consider the packet 400 to be invalid.

Key number 430 is a value that identifies the keys 134 and 136 used to encrypt a packet 400, and thus, usable to decrypt a packet. As shown, in various embodiments, key number 430 is the salt 314 used to derive keys 134 and 136. In some embodiments, a key number 430 is valid for an entire network session and does not change for the session even if a key rollover is performed during the session. In doing so, an HSM 130 may predetermine keys 134 and 136 prior to a rollover. That is, in some embodiments, once an HSM 130 is aware of the key number 430 (either because it determined the number or it received the number in an earlier packet 400), the HSM 130 can predict what the subsequent synchronized time value 312 will be at rollover and derive the corresponding keys 134 and 136 based on the key number 430 and predicted time value 312. This predicted time value 312 may be determined from an earlier packet 400 or based on an HSM 130's local clock 132.

Payload 440 includes the encrypted content being transported by packet 400. In the illustrated embodiment, payload 440 is the portion of packet 400 that is encrypted by a node 120 using a node key 134. In other embodiments, payload 440 may be encrypted by an HSM 130 using an HSM key 136 (or by circuitry other than nodes 120 and HSMs 130 in some embodiments).

MAC 450 is a message authentication code usable by an HSM 130 (or node 120) to verify the integrity of packet 400. In the illustrated embodiment, MAC 450 is encrypted by an HSM 130 of the sending node 120 using an HSM key 136 and later decrypted and verified by an HSM 130 of the receiving node 120. In some embodiments, MAC 450 is produced by a node 120 when performing an AES-GCM encryption using a node key 134; the node 120 then provides this MAC 450 to its HSM 130 for encryption using an HSM key 136. (In other embodiments, MAC 450 may be encrypted by a node 120 using a node key 134 or by circuitry other than nodes 120 and HSMs 130. In some embodiments, HSMs 130 may encrypt portions other than MAC 450; MAC 450 may also not be encrypted.)

Figure 5A:
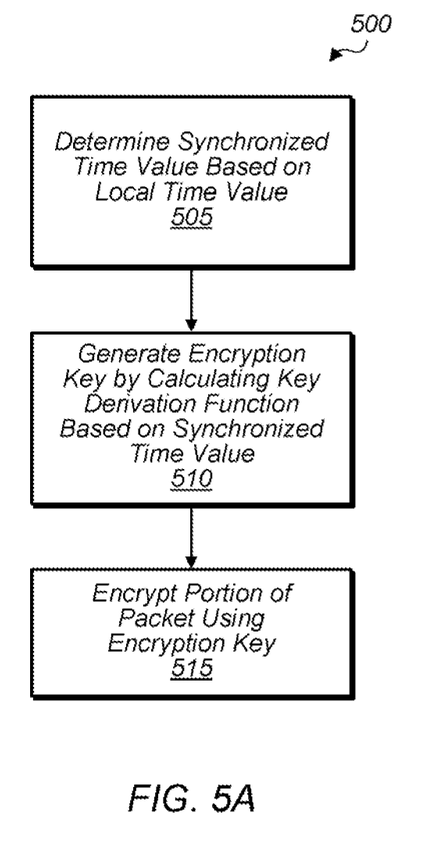
FIGS. 5A-5C are flow diagrams illustrating examples of methods that may be performed by network components to securely communicate using derived keys.

Turning now to FIG. 5A, a flow diagram of a method 500 is depicted. Method 500 is one example of a method for encrypting packet data using an encryption key derived based on time such as keys 134 and 136 discussed above. In various embodiments, method 500 is performed by a circuit having a local clock such as an HSM 130 having a local clock 132. In various embodiments, performance of method 500 prevents inadvertent reuse of previously derived keys.

In step 505, the circuit (e.g., HSM 130A) determines a synchronized time value (e.g., time value 312) based on the local time value (e.g., as maintained by a local clock 132) such that the synchronized time value is an expected time value of a reference clock (e.g., reference clock 142). In various embodiments, step 505 may include determining an offset based on a time difference and/or a frequency difference between the local clock and the reference clock, and applying the offset to the local time value. In some embodiments, step 505 may include using an algorithm such as IEEE 802.1 AS, NTP, etc.

In step 510, the circuit generates a first encryption key (e.g., an HSM key 136) by calculating a key derivation function based on the synchronized time value. In various embodiments, calculating the key derivation function includes encrypting the synchronized time value using another encryption key (e.g., a provisioned key 152) that has a longer validity period than a validity period of the first encryption key. In some embodiments, the first circuit receives the other encryption key (e.g., via gateway 150) from a source that is external to the first circuit. In some embodiments, calculating the key derivation function includes generating a random value (e.g., salt 314) using a random number generator (e.g., RNG 330), and encrypting the synchronized time value and the random value using the other encryption key to generate the first encryption key. In some embodiments, step 510 further includes generating a second encryption key (e.g., a node key 134) for a first network node (e.g., node 120A) coupled to the circuit by calculating a key derivation function based on the synchronized time value, and providing the second encryption key to the first network node.

In step 515, the circuit encrypts a portion (e.g., MAC 450) of a packet using the first encryption key, the portion of the packet to be communicated to a second circuit (e.g., HSM 130B). In various embodiments, the first network node coupled to the first circuit communicates the packet to a second network node (e.g., node 120B) coupled to the second circuit. In some embodiments, the first node includes the synchronized time value in the packet as a packet identifier (e.g., identifier 420) usable by the second circuit to validate the packet. In some embodiments, the first network node encrypts of a payload (e.g., payload 440) of the packet using the second encryption key generated in step 510.

In some embodiments, method 500 further includes determining, based on the local clock, that the first encryption key has expired. In response to the first encryption key expiring, the first circuit generates a subsequent encryption key using the other encryption key to encrypt another synchronized time value and the random value, and encrypts a portion of another packet using the subsequent encryption key, the portion of the other packet to be communicated to the second circuit. In various embodiments, method 500 further includes receiving, from a third circuit, an encrypted portion of another packet having a synchronized time value included by the third circuit. In such an embodiment, the first circuit may derive a key based on the included synchronized time value and use the derived key to decrypt the encrypted portion of the other packet.

Figure 5B:
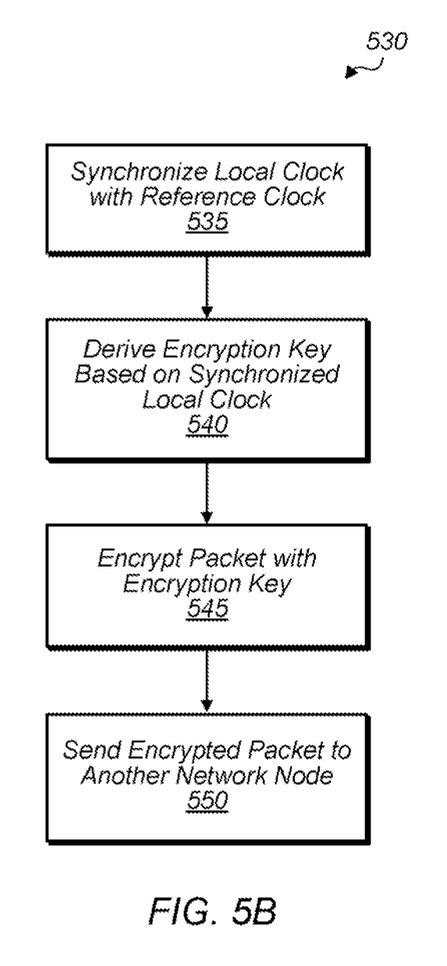

Turning now to FIG. 5B, a flow diagram of a method 530 is depicted. Method 530 is another example of a method for encrypting packet data using an encryption key derived based on time such as keys 134 and 136 discussed above. In various embodiments, method 500 is performed by an apparatus having a circuit configured to derive the key, such as an HSM 130, and a network node configured to perform the encryption, such as a node 120.

Method 530 begins in step 535 with a first circuit (e.g., HSM 130A) that has a local clock synchronizing the local clock with a reference clock (e.g., reference clock 142) external to the first circuit. In step 540, the first circuit derives a first encryption key (e.g., a node key 134) based on the synchronized local clock. In some embodiments, the first circuit receives a second encryption key (e.g., a provisioned key 152) via a network interface (e.g., gateway 150) configured to communicate over a wide area network, and uses the second encryption key to derive the first encryption key. In step 545, a first network node encrypts a first packet (e.g., payload 440) with the first encryption key derived by the first circuit. In some embodiments, the first network node uses the first encryption key for encrypting packets sent to a second network node, but not for decrypting packets received from the second network node. In some embodiments, the first net-work node is an electronic control unit (ECU) configured to control operation of a vehicle. In step 550, the first network node sends the encrypted first packet to a second network node (e.g., node 120B) associated with a second circuit (e.g., HSM 130B) having a local clock synchronized with the reference clock. In some embodiments, the first network node includes a time value of the synchronized local clock in the first packet such that the time value is used by the first circuit to generate the first encryption key and is usable by the second circuit to derive the first encryption key.

In some embodiments, method 530 may include the first network node sending a plurality of packets of a network session to the second network node, the first packet being one of the plurality of packets. In such an embodiment, the first circuit may determine, during the network session, that the first encryption key has expired, derive a third encryption key based on the second encryption key, and use the third encryption key to encrypt a second packet of the plurality of packets. In some embodiments, method 530 may include the first network node receiving an encrypted second packet from a third network node. In such an embodiment, the first circuit may derive a third encryption key based on a fourth encryption key received via the network interface, and use the third encryption key to decrypt the second encrypted packet.

Figure 5C:
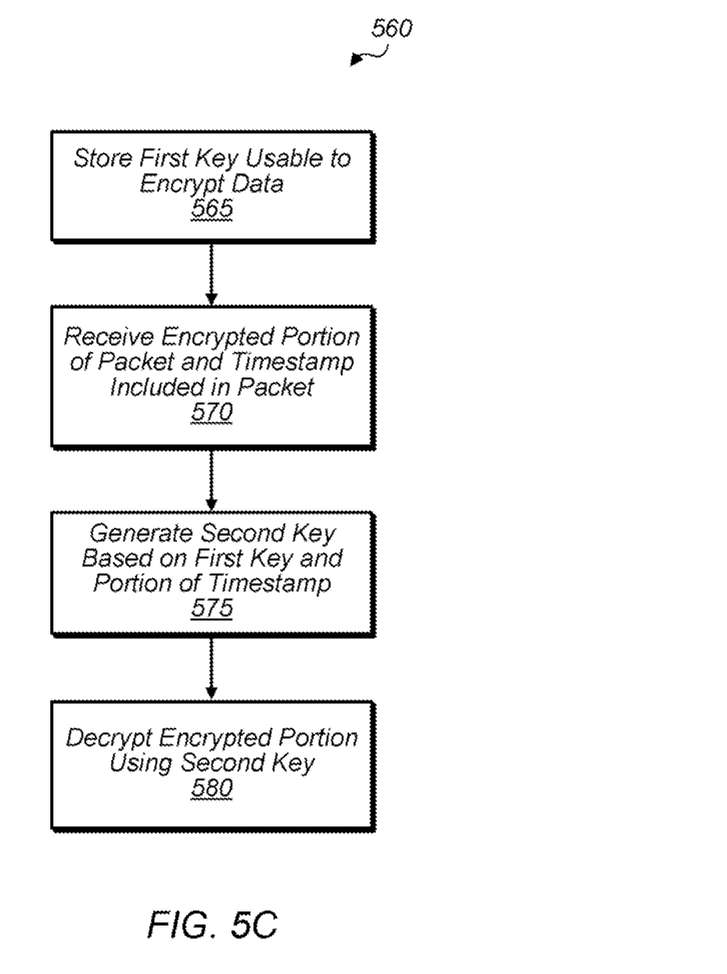

Turning now to FIG. 5C, a flow diagram of a method 560 is depicted. Method 560 is one example of a method for decrypting packet data using an encryption key derived based on time such as keys 134 and 136 discussed above. In various embodiments, method 560 is performed by a circuit such as an HSM 130. In various embodiments, performance of method 500 prevents inadvertent reuse of previously derived keys.

Method 560 begins in step 565 with a first circuit (e.g., HSM 130A) storing a first key (e.g., a provisioned key 152) usable to encrypt data. In step 570, the first circuit receives, from a second circuit (e.g., HSM 130B), an encrypted portion (e.g., MAC 450) of a first packet and a first timestamp (e.g., Packet ID 420) included in the first packet. In various embodiments, a first network node (e.g., node 120A) coupled to the first circuit receives the first packet and requests that the first circuit decrypt the encrypted portion of the first packet. In some embodiments, the first network node is an electronic control unit (ECU) configured to receive the first packet over a vehicle network. In step 575, the first circuit generates a second key (e.g., HSM key 136) based on the first key and a portion of the first timestamp (e.g., after application of mask 320). In some embodiments, the first circuit includes a first local clock, and synchronizes the first local clock with a reference clock. In such an embodiment, the second circuit has a second local clock, and synchronizes the second local clock with the reference clock. The second circuit then generates the first timestamp based on the synchronized second clock. In step 580, the first circuit decrypts the encrypted portion using the second key. In some embodiments, the first circuit may receive an encrypted portion of a second packet and a second timestamp included in the second packet, the first packet and the second packet being communicated within the same network session. In such an embodiment, the first circuit may validate the second packet by comparing the first timestamp with the second timestamp, and based on validation of the second packet, determine whether to decrypt the encrypted portion of the second packet.

Exemplary Computer System

Figure 6:
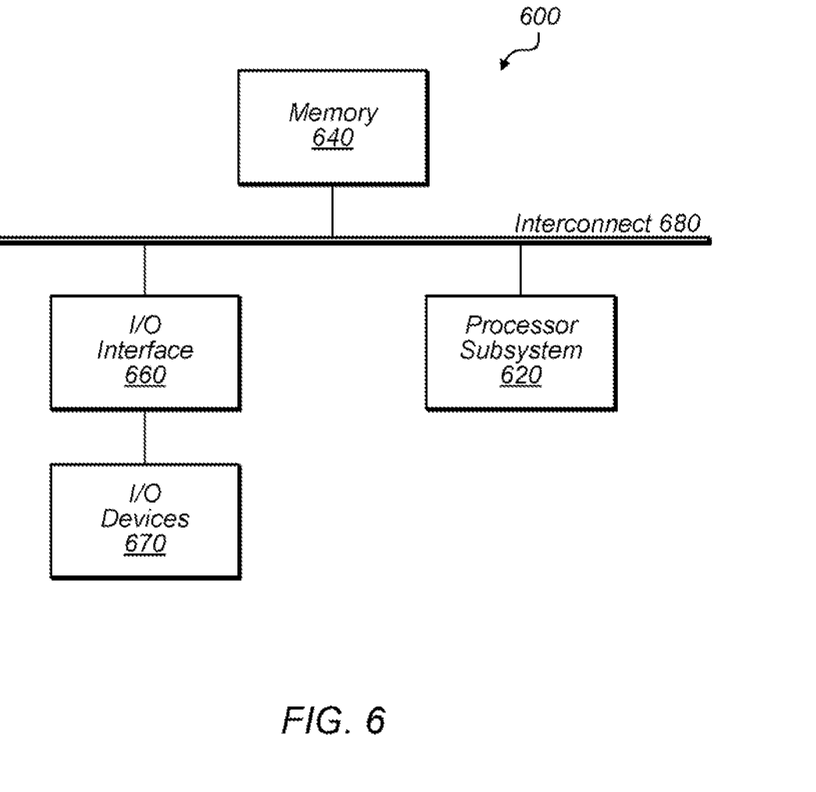
FIG. 6 is a block diagram illustrating an exemplary computer system.

Turning now to FIG. 6, a block diagram of an exemplary computer system 600 is depicted. Computer system 600 is one embodiment of a computer system that may be used to implement one or more components of secure network 100 such as switch 110, nodes 120 or gateway 150. In the illustrated embodiment, computer system 600 includes a processor subsystem 620 that is coupled to a system memory 640 and I/O interfaces(s) 660 via an interconnect 680 (e.g., a system bus). I/O interface(s) 660 is coupled to one or more I/O devices 670. Computer system 600 may be any of various types of devices, including, but not limited to, a server system, personal computer system, network computer, an embedded system, etc. Although a single computer system 600 is shown in FIG. 6 for convenience, system 600 may also be implemented as two or more computer systems operating together.

Processor subsystem 620 may include one or more processors or processing units. In various embodiments of computer system 600, multiple instances of processor subsystem 620 may be coupled to interconnect 680. In various embodiments, processor subsystem 620 (or each processor unit within 620) may contain a cache or other form of on-board memory.

System memory 640 is usable store program instructions executable by processor subsystem 620 to cause system 600 perform various operations described herein. System memory 640 may be implemented using different physical, non-transitory memory media, such as hard disk storage, floppy disk storage, removable disk storage, flash memory, random access memory (RAM-SRAM, EDO RAM. SDRAM, DDR SDRAM, RAMBUS RAM, etc.), read only memory (PROM, EEPROM, etc.), and so on. Memory in computer system 600 is not limited to primary storage such as memory 640. Rather, computer system 600 may also include other forms of storage such as cache memory in processor subsystem 620 and secondary storage on I/O Devices 670 (e.g., a hard drive, storage array, etc.). In some embodiments, these other forms of storage may also store program instructions executable by processor subsystem 620 to perform operations described herein.

I/O interfaces 660 may be any of various types of interfaces configured to couple to and communicate with other devices, according to various embodiments. In one embodiment, I/O interface 660 is a bridge chip (e.g., Southbridge) from a front-side to one or more back-side buses. I/O interfaces 660 may be coupled to one or more I/O devices 670 via one or more corresponding buses or other interfaces. Examples of I/O devices 670 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 670 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a network interface configured to communicate over a wide area network;
   a first secure circuit including an internal local clock, a cryptographic circuit, and a key storage, wherein the first secure circuit is configured to:
   synchronize the local clock with a reference clock external to the first secure circuit;
   receive, into the key storage, a derivation key via the network interface from the wide area network, wherein the cryptographic circuit is configured to isolate access to the key storage from other circuits of the apparatus; and
   derive, by the cryptographic circuit via a key derivation function, a first encryption key by using a particular time value of the synchronized local clock and the derivation key from the key storage; and
   a first network node coupled to the first secure circuit and configured to:
   receive the derived first encryption key from the first secure circuit, wherein the first network node is distinct from the first secure circuit;
   encrypt a first packet with the first encryption key derived by the first secure circuit; and
   send the encrypted first packet to a second network node associated with a second secure circuit having access to a different local clock synchronized with the reference clock.

2. The apparatus of claim 1, wherein the cryptographic circuit is configured to calculate the key derivation function using the derivation key to perform an encryption operation on the particular time value.

3. The apparatus of claim 1, wherein the first network node is configured to send a plurality of packets of a network session to the second network node, wherein the plurality of packets includes the first packet; and
wherein the first secure circuit is configured to:
during the network session, determine that the first encryption key has expired;
derive, by the cryptographic circuit, a second encryption key based on the derivation key; and
use the second encryption key to encrypt, by the cryptographic circuit, a second packet of the plurality of packets.

4. The apparatus of claim 1, wherein the first network node is configured to receive an encrypted second packet from a third network node; and
wherein the first secure circuit is configured to:
derive, by the cryptographic circuit, a second encryption key based on a different derivation key received via the network interface; and
use the second encryption key to decrypt, by the cryptographic circuit, the second encrypted packet.

5. The apparatus of claim 1, wherein the first network node is configured to include the particular time value of the synchronized local clock in the first packet, wherein the particular time value is usable by the second secure circuit to derive the first encryption key.

6. The apparatus of claim 1, wherein the first network node is configured to use the first encryption key for encrypting packets sent to the second network node, but not for decrypting packets received from the second network node.

7. The apparatus of claim 1, wherein the first network node is an electronic control unit (ECU) configured to control a system of a vehicle.

8. The apparatus of claim 1, wherein to synchronize the local clock with the reference clock, the first secure circuit is configured to:
determine a current local time value using the local clock:
determine an offset using a received synchronization communication that includes an indication of a current value of the reference clock; and
apply the offset to the current local time value to determine a synchronized time value.

9. The apparatus of claim 8, wherein to derive the first encryption key, the cryptographic circuit is configured to calculate the key derivation function based on the synchronized time value, the derivation key, and a value from a pseudo random data generator.

10. A method, comprising:
synchronizing, by a first secure circuit including a local clock, a cryptographic circuit, and a key storage, the local clock with a reference clock external to the first secure circuit;
receiving, by the first secure circuit and into the key storage, a derivation key via a network interface coupled to a wide area network, wherein the cryptographic circuit is configured to isolate access to the key storage from other circuits of an apparatus that includes a first network node and the first secure circuit;
determining, by the first secure circuit using the local clock, a current synchronized time value;
using, by the first secure circuit using the cryptographic circuit, the current synchronized time value and the derivation key in a cryptographic algorithm to derive a first encryption key;
encrypting, by the first network node coupled to the first secure circuit, a first packet with the first encryption key; and
sending, by the first network node to a second network node, the encrypted first packet.

11. The method of claim 10, further comprising:
including, by the first network node, the current synchronized time value with the encrypted first packet as a packet identifier usable, by a second secure circuit coupled to the second network node, to validate the encrypted first packet.

12. The method of claim 10, wherein determining the current synchronized time value includes:
determining, by the first secure circuit, an offset using a received synchronization communication that includes an indication of a current value of the reference clock; and
applying, by the first secure circuit, the offset to a current local time value to determine the current synchronized time value.

13. The method of claim 10, wherein the cryptographic algorithm is Advanced Encryption Standard (AES).

14. The method of claim 10, further comprising:
receiving, by the first network node from the second network node, an encrypted second packet; and
using, by the first secure circuit using the cryptographic circuit, a second encryption key, different from the first encryption key, to decrypt the encrypted second packet.

15. The method of claim 10, wherein deriving the first encryption key includes calculating, by the cryptographic circuit, a key derivation function based on the current synchronized time value, wherein the key derivation function includes a generated random value.

16. A non-transitory computer readable medium having program instructions stored therein that are executable by a first network node to cause the first network node to perform operations comprising:
causing a first secure circuit, coupled to the first network node, to maintain a local time value in a local clock, wherein the first secure circuit includes the local clock, a cryptographic circuit, and a key storage;
causing the first secure circuit to synchronize the local time value of the local clock with a reference clock external to the first secure circuit;
causing the first secure circuit to receive, via a network interface communicating over a wide area network, a derivation key into the key storage, wherein the cryptographic circuit is configured to isolate access to the key storage from other circuits of an apparatus that includes the first network node and the first secure circuit;
causing the first secure circuit to derive a first encryption key by using the synchronized local time value and the derivation key in a key derivation function;
receiving the first encryption key from the first secure circuit;
encrypting a first packet with the first encryption key; and
sending, to a second network node, the encrypted first packet.

17. The non-transitory computer readable medium of claim 16, wherein the operations further include:
sending the synchronized local time value with the encrypted first packet as a packet identifier usable, by a second secure circuit coupled to the second network node, to validate the encrypted first packet.

18. The non-transitory computer readable medium of claim 16, wherein the operations further include:
   receiving, from the second network node, an encrypted second packet; and
   causing the first secure circuit to decrypt, using the cryptographic circuit, the encrypted second packet using a second encryption key that is different from the first encryption key.

19. The non-transitory computer readable medium of claim 16, wherein the operations further include:
   causing the first secure circuit to derive, using the cryptographic circuit, a second encryption key using the synchronized local time value; and
   encrypting a payload of the first packet using the second encryption key.

20. The non-transitory computer readable medium of claim 16, wherein the first network node is an electronic control unit (ECU), and wherein the operations further include controlling a system of a vehicle.

\* \* \* \* \*